(12) United States Patent
Spracklen et al.

(10) Patent No.: US 9,674,263 B2
(45) Date of Patent: Jun. 6, 2017

(54) MEASUREMENT OF REMOTE DISPLAY RESPONSIVENESS TO APPLICATION DISPLAY CHANGES

(71) Applicant: VMware, Inc., Palo Alto, CA (US)

(72) Inventors: Lawrence Spracklen, Boulder Creek, CA (US); Banit Agrawal, Sunnyvale, CA (US); Rishi Bidarkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 354 days.

(21) Appl. No.: 14/137,560

(22) Filed: Dec. 20, 2013

(65) Prior Publication Data

US 2015/0180933 A1  Jun. 25, 2015

(51) Int. Cl.
| | |
|---|---|
| *G06F 3/048* | (2013.01) |
| *H04L 29/08* | (2006.01) |
| *G09G 5/02* | (2006.01) |
| *G06F 17/24* | (2006.01) |
| *G06F 3/14* | (2006.01) |
| *G09G 5/34* | (2006.01) |
| *H04N 21/258* | (2011.01) |
| *H04N 21/442* | (2011.01) |
| *H04N 21/658* | (2011.01) |

(52) U.S. Cl.
CPC .............. *H04L 67/025* (2013.01); *G06F 3/14* (2013.01); *G06F 17/246* (2013.01); *G09G 5/02* (2013.01); *G09G 5/34* (2013.01); *G09G 2330/12* (2013.01); *G09G 2340/02* (2013.01); *G09G 2340/04* (2013.01); *G09G 2340/0428* (2013.01); *G09G 2350/00* (2013.01); *G09G 2360/08* (2013.01); *G09G 2370/022* (2013.01); *H04N 21/25825* (2013.01); *H04N 21/25833* (2013.01); *H04N 21/4424* (2013.01); *H04N 21/6582* (2013.01)

(58) Field of Classification Search
CPC ....... H04L 67/025; G06F 3/14; G06F 17/246; G09G 5/02
USPC .......................................... 715/740; 345/619
See application file for complete search history.

(56) References Cited

U.S. PATENT DOCUMENTS

| | | | |
|---|---|---|---|
| 7,106,347 B1 * | 9/2006 | Rosenberg | ................ G06T 1/60 345/533 |
| 7,233,336 B2 | 6/2007 | Mondal | |
| 8,127,233 B2 | 2/2012 | McDowell | |
| 8,341,624 B1 | 12/2012 | Hobbs | |
| 8,396,122 B1 | 3/2013 | Taylor | |

(Continued)

*Primary Examiner* — Abdullah Al Kawsar
*Assistant Examiner* — Jian Yu

(57) ABSTRACT

One method for managing remote display performance includes operations for embedding pixel data in a file of an application executing on a server, and detecting an open window of a graphical user interface (GUI) associated with the application. The pixel data is used to create a pixel strip in the window, while the GUI is being displayed on a remote display of a remote client. Update information for the GUI being displayed on the remote display is transmitted from the server to the remote client, the update information corresponding to the change in the presentation of the open window on the server. Further, a change in a presentation of the open window is detected, and a pixel strip received at the remote display is identified. A performance metric for the remote display is calculated based on the received pixel strip when compared to the expected values for the pixel strip.

17 Claims, 9 Drawing Sheets

(56) References Cited

U.S. PATENT DOCUMENTS

| | | |
|---|---|---|
| 8,453,148 B1 | 5/2013 | Hobbs |
| 8,489,704 B1 | 7/2013 | Mendez |
| 8,743,954 B1 | 6/2014 | Masterson |
| 8,774,536 B1 | 7/2014 | Jia |
| 8,902,248 B1 * | 12/2014 | Bidarkar ............... G06F 17/246 345/619 |
| 8,972,893 B2 | 3/2015 | Duncan |
| 9,235,313 B2 | 1/2016 | Wu |
| 2003/0099411 A1 * | 5/2003 | Kokemohr ......... G06F 3/04845 382/309 |
| 2004/0098731 A1 | 5/2004 | Demsey |
| 2004/0125110 A1 | 7/2004 | Kohda |
| 2004/0205514 A1 | 10/2004 | Sommerer |
| 2004/0255276 A1 | 12/2004 | Rovang |
| 2005/0010861 A1 * | 1/2005 | Augustyn ............. G06F 17/246 715/213 |
| 2005/0124389 A1 | 6/2005 | Yang |
| 2006/0078051 A1 | 4/2006 | Liang et al. |
| 2007/0009045 A1 | 1/2007 | Mohandas |
| 2007/0022144 A1 | 1/2007 | Chen |
| 2008/0155454 A1 | 6/2008 | Balasubramanian |
| 2009/0037774 A1 | 2/2009 | Rideout et al. |
| 2009/0128491 A1 | 5/2009 | Katayama |
| 2009/0153585 A1 | 6/2009 | Mahajan |
| 2009/0210817 A1 | 8/2009 | Schmieder |
| 2009/0222739 A1 | 9/2009 | Schmieder |
| 2009/0234940 A1 | 9/2009 | Pal et al. |
| 2009/0319933 A1 | 12/2009 | Zaika |
| 2010/0007788 A1 | 1/2010 | Lee et al. |
| 2010/0020875 A1 | 1/2010 | Macq |
| 2010/0064260 A1 | 3/2010 | Amano |
| 2010/0161711 A1 * | 6/2010 | Makhija ................. G06F 9/455 709/203 |
| 2010/0162338 A1 * | 6/2010 | Makhija ................. H04N 7/173 725/114 |
| 2010/0290667 A1 | 11/2010 | Lienhart et al. |
| 2011/0010629 A1 | 1/2011 | Castro |
| 2011/0199389 A1 | 8/2011 | Lu |
| 2011/0249572 A1 | 10/2011 | Singhal et al. |
| 2011/0276900 A1 | 11/2011 | Khan |
| 2012/0042252 A1 | 2/2012 | Neerudu |
| 2012/0084774 A1 | 4/2012 | Post et al. |
| 2012/0307074 A1 | 12/2012 | Bhagavathy et al. |
| 2013/0067331 A1 | 3/2013 | Glazer |
| 2013/0097426 A1 | 4/2013 | Agrawal |
| 2013/0132971 A1 | 5/2013 | Asuncao |
| 2013/0156100 A1 | 6/2013 | Matsui |
| 2013/0166629 A1 | 6/2013 | Ivashin |
| 2013/0187916 A1 | 7/2013 | Toy |
| 2013/0290856 A1 | 10/2013 | Beveridge |
| 2014/0153457 A1 | 6/2014 | Liu |
| 2014/0226901 A1 | 8/2014 | Spracklen |
| 2014/0320673 A1 * | 10/2014 | Agrawal ............ H04N 21/25825 348/189 |
| 2015/0009222 A1 | 1/2015 | Diard |
| 2015/0019694 A1 | 1/2015 | Feng |
| 2015/0030084 A1 | 1/2015 | Marchya |
| 2015/0043312 A1 | 2/2015 | Wu |
| 2015/0046852 A1 | 2/2015 | Furtwangler |
| 2015/0127716 A1 | 5/2015 | Agrawal |
| 2015/0181207 A1 | 6/2015 | Agrawal et al. |
| 2015/0186102 A1 | 7/2015 | Yamaguchi |
| 2015/0194136 A1 | 7/2015 | Diard |
| 2015/0312599 A1 | 10/2015 | Brockmann |
| 2016/0073113 A1 | 3/2016 | Rintaluoma |

* cited by examiner

MEASUREMENT OF REMOTE DISPLAY RESPONSIVENESS TO APPLICATION DISPLAY CHANGES

CROSS REFERENCE TO RELATED APPLICATIONS

This application is related to U.S. patent application Ser. No. 13/432,331, and entitled "Method and System for Measuring Display Performance of a Remote Application," which claims priority from U.S. Provisional Application No. 61/507,939, filed on Jul. 14, 2011, and entitled "3D and Interactive Workload Design and Measurement for Remote Applications," which are incorporated herein by reference.

BACKGROUND

In typical virtualized desktop infrastructure architectures, displays and input devices are local, and applications execute remotely in a server. The user's desktop is typically hosted in a datacenter or cloud, and the user remotely interacts with the user's desktop via a variety of endpoint devices, including desktops, laptops, thin clients, smart phones, tablets, etc. There are many advantages to this approach, including cost savings, improved mobility, easier management and deployment of applications, etc.

Remote display protocols are utilized to transfer the display of a remote desktop to the end-client. As applications executing in the desktop generate changes to the display, the remote display protocol transfers the display data to the remote client.

However, the available bandwidth between a virtual desktop server (or a remote application in general) and a client device can vary due to many factors, for example, network congestion. A virtual desktop server at one location may have a faster connection to the client device than another server at a different location. Further, the amount of required bandwidth for transmitting the desktop output can vary depending on the user's activity.

Some window operations, such as opening or closing a window in a graphical user interface (GUI), create a large amount of changes in the remote display in a short amount of time. Other operations, such as resizing the window, or scrolling the content of a window, may also cause large changes in the display area. If the network resources are not sufficient, the window operations may result in poor quality of the remote display, at least for transient periods until the window-altering operation ends.

It is in this context that embodiments arise.

SUMMARY

Embodiments provide methods, systems, and computer programs for measuring remote display performance and display quality. It should be appreciated that the present embodiments can be implemented in numerous ways, such as a process, an apparatus, a system, a device, or a method on a computer readable medium. Several inventive embodiments are described below.

In one embodiment, a method for measuring remote display quality includes operations for embedding pixel data in a file associated with an application executing on a server, and for detecting an open window of a graphical user interface (GUI) associated with the application. The pixel data is used to create a pixel strip in the open window, and the GUI is being displayed on a remote display executing on a remote client. The method includes another operation for transmitting, from the server to the remote client, update information for the GUI being displayed on the remote display, the update information corresponding to the change in the presentation of the open window on the server. Further, the method includes operations for detecting a change in a presentation of the open window, and for identifying a pixel strip received at the remote display resulting from the change in the presentation. A performance metric for the remote display is calculated based on the received pixel strip. In another embodiment, the operations of the method are executed by a processor.

In another embodiment, a method includes an operation for displaying a remote display on a remote client. The remote display includes a representation of a graphical user interface (GUI) executing on a server, where the GUI is operable to display an open window for an application executing on the server. Further, the method includes an operation for receiving data regarding a change in a presentation of the open window, where pixel data is embedded in a file associated with the application. The pixel data is used to create a pixel strip in the open window. In addition, the method includes operations for identifying a pixel strip received at the remote display resulting from the change in the presentation, and for calculating a performance metric for the remote display based on the pixel strip received.

In yet another embodiment, a non-transitory computer-readable storage medium, that stores a computer program, includes program instructions for embedding pixel data in a file associated with an application executing on a server, and program instructions for detecting an open window of a graphical user interface (GUI) associated with the application. The pixel data is used to create a pixel strip in the open window, and the GUI is displayed on a remote display executing on a remote client. The storage medium further includes program instructions for detecting a change in a presentation of the open window, and program instructions for transmitting, from the server to the client, update information corresponding to the change in the presentation of the open window. The update information includes at least a portion of the pixel strip. Further, in response to receiving the update information, the client is configured to identify a pixel strip received at the remote display resulting from the change in the presentation, and configured to calculate a performance metric for the remote display based on the pixel strip received.

Other aspects of the embodiments will become apparent from the following detailed description, taken in conjunction with the accompanying drawings, illustrating by way of example the principles of the embodiments.

BRIEF DESCRIPTION OF THE DRAWINGS

The embodiments may best be understood by reference to the following description taken in conjunction with the accompanying drawings in which.

DETAILED DESCRIPTION

Methods, systems, and computer programs are presented for measuring remote display performance of a display used by a remote desktop client. It should be noted, however, that the embodiments may be practiced without some or all of these specific details. In other instances, well known process operations have not been described in detail in order not to unnecessarily obscure the present embodiments.

Figure 1A:
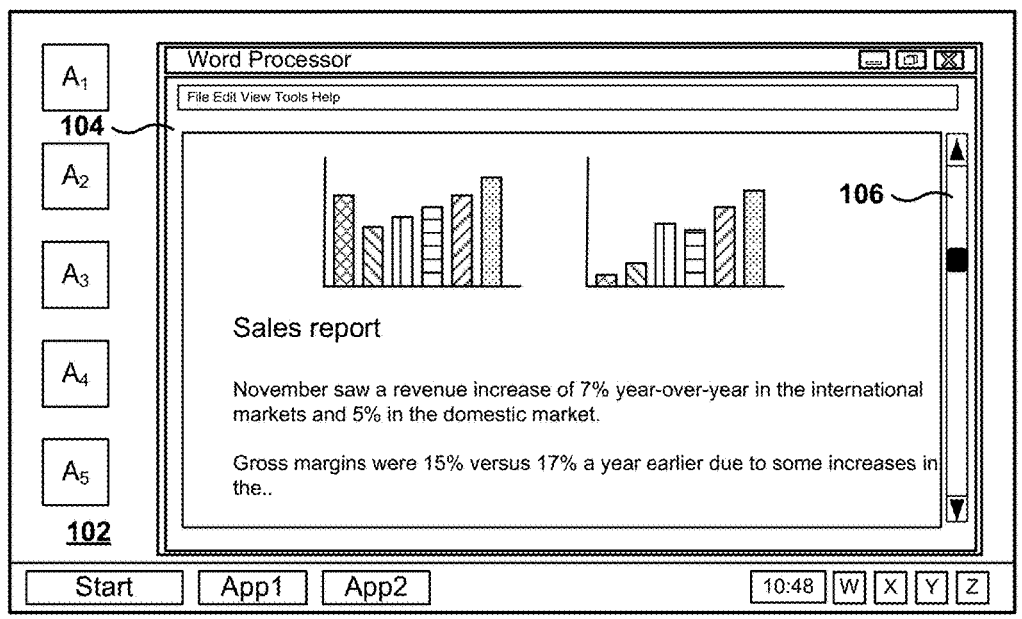
FIGS. 1A-1B illustrate potential display problems when scrolling a window on a remote display, according to one embodiment.
Figure 1B:
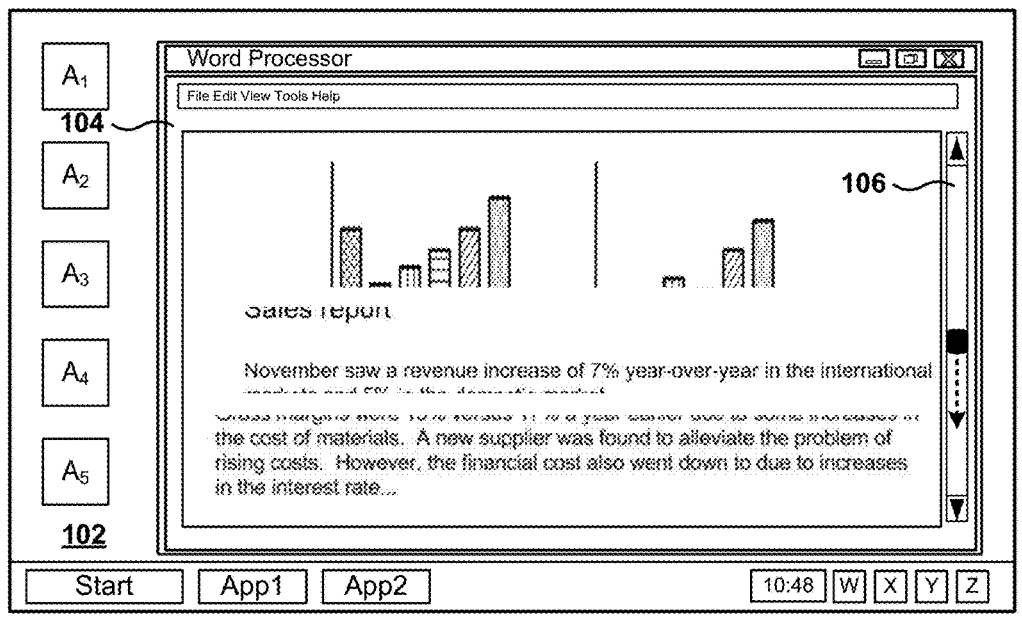

FIGS. 1A-1B illustrate potential display problems when scrolling a window on a remote display, according to one embodiment. FIG. 1A shows a desktop view of the Windows environment. Typically, a desktop may include one or more open Windows (e.g., window 104 for a word processor), shortcuts on the desktop, icons associated with the open Windows, a notification area, etc.

Oftentimes, a window displays a document that includes a plurality of pages, but due to the size of the window, only a section of the document is presented at a time. The document may include text, graphics, photos, sounds, hyperlinks, videos, etc. A scroll bar 106 identifies the location of the current view of the document with respect to the complete document, and the window interface provides options for scrolling the document up and down (e.g., moving the page identifier within the scrollbar, pressing an arrow key on the keyboard, using the wheel of a mouse, etc.).

Sometimes, when a user performs a window operation (e.g., open, close, minimize, maximize, scroll, move, resize, zoom in the view of the page, zoom out the view of the page, etc.) the changes on the display view occur quickly and over a large area of the display. If there is congestion due to shortage of network or processing resources, the window operation may cause a slow response in the remote display because it may take some time for the remote client to receive update information corresponding to the changes in the display. For example, FIG. 1B illustrates a scroll operation on the window of FIG. 1A.

Due to network congestion (or some other reason), the view on the window 104 is not smooth, where blocks of the display are updated at different rates or in different video frames, resulting in a fragmented display, which lowers the perceived user quality of the remote display.

Sometimes, scroll operations happen in several operations, which result in several display updates sent over the network. In some embodiments, the display protocol has to choose how to effectively deliver those updates, for example, by eliminating some of the updates, or by combining some of the updates.

In the VDI environment, it is critical to have the ability to accurately track user experience in a large scale. However, it is not sufficient to track a simple metric such as CPU utilization in order to make this determination. Rather, a user's perception of their desktop's performance is based on a myriad of different factors. One of these factors is the responsiveness and fluidity of window operations.

If a user complaints that the scrolling operation performs poorly in the remote display, a way to measure the quality of the remote windows rendering is needed. Subjective measurements may vary from user to user and do not provide a good metric to determine the necessary resources to correct problems.

However, an approach is needed that measures window responsiveness for different specific applications, and using a standard display as used by each application. Also, the painted window may not be well suited for image compression to send display updates. As a result, the computational and bandwidth associated with the painted window operations may be higher than the ones associated with typical window operations (where much of the window may be a plain white, easily compressible, uniform background, etc.).

Figure 2:
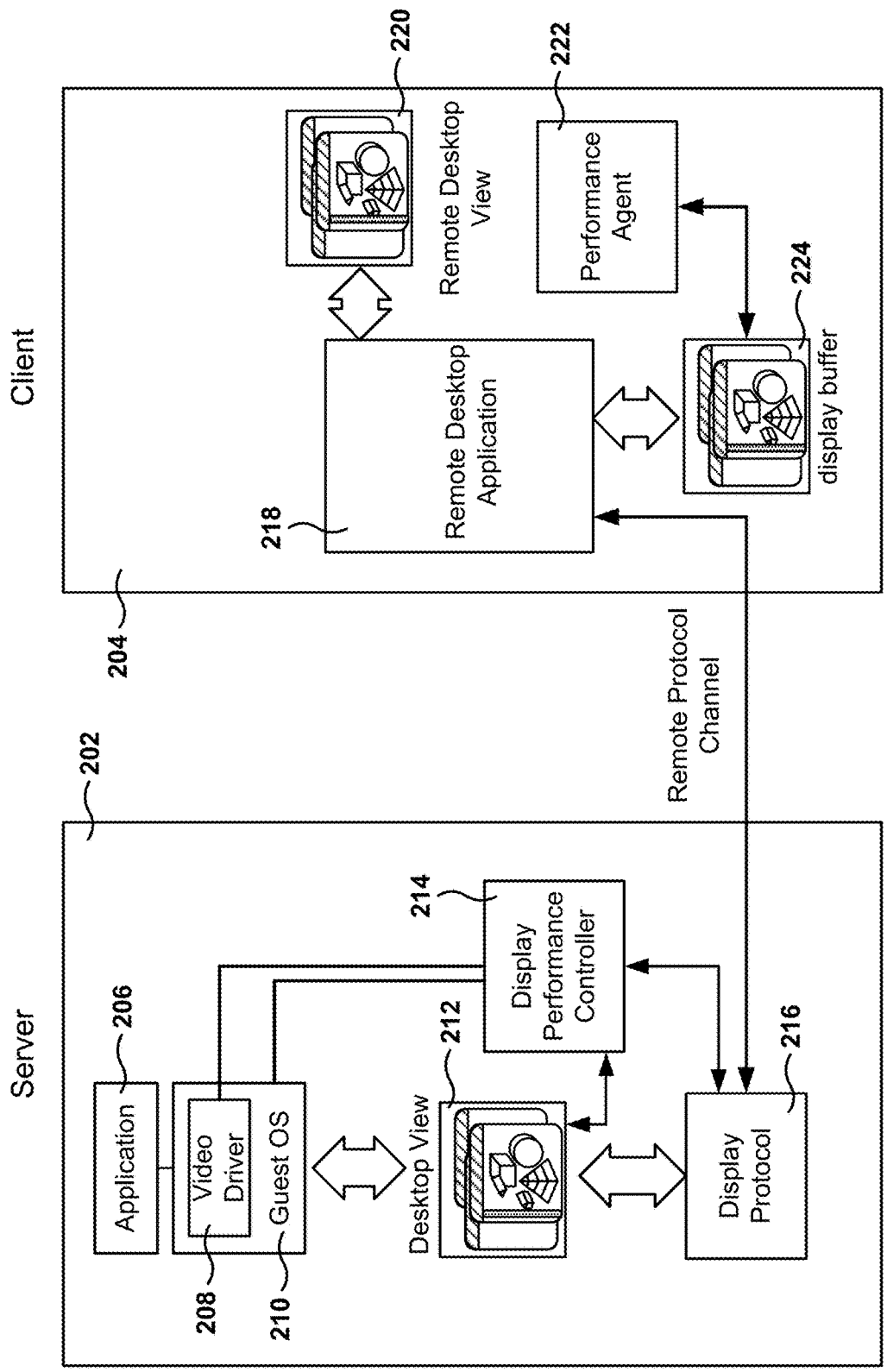
FIG. 2 shows an architecture for measuring remote display performance, in accordance with one embodiment.

FIG. 2 shows an architecture for measuring remote display performance, in accordance with one embodiment. Server 202 includes virtual machines executing on the server, which then transmits the display output to client 204. In the embodiment of FIG. 2, application 206 is executing in a virtual machine. The application executes within Guest Operating System (GOS) 210, which includes video driver 208 for updating desktop view 212. In one embodiment, video driver 208 includes and Application Programming Interface (API) for updating the desktop view 212.

Display protocol 216 is used when transmitting display updates to the remote desktop application 218 in client 204. At the client 204 side, the remote desktop application 218 receives the display data and updates display buffer 224, which results in the updated remote desktop view 220. Remote desktop application 218 provides the content of the display buffer to a display, which may be integrated within, or connected to, client 204.

Embodiments presented herein, perform quality measurements to determine the quality of the remote desktop view in reference to windows-altering operations performed on the remote desktop. In one embodiment, display performance controller 214 works with performance agent 222 at client 204 to measure the performance of window-altering operations in the remote desktop. Performance agent 222 analyzes the content of display buffer 224 when the window operations are taking place and measures the quality of the remote display by analyzing color markers inserted in the windows.

Embodiments presented herein are described with reference to a remote desktop view, but the same principles may be used for mixed remote desktop applications where the remote desktop is displayed within a frame (e.g., a window) of a local display. In the mixed remote desktop applications, a software application or an operating system feature allows a computer's desktop environment to be run remotely on one system (usually a PC, but the concept applies equally to a server), while being displayed on a separate client device.

Figure 3A:
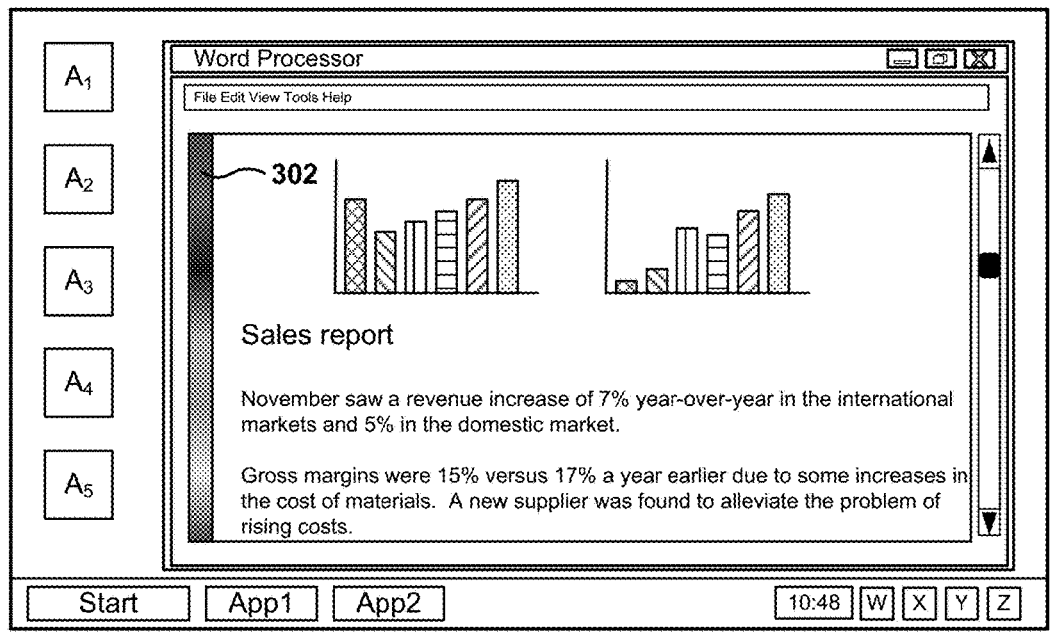
FIGS. 3A-3B illustrate the use of a color marker embedded inside a window display for measuring remote display quality, according to one embodiment.
Figure 3B:
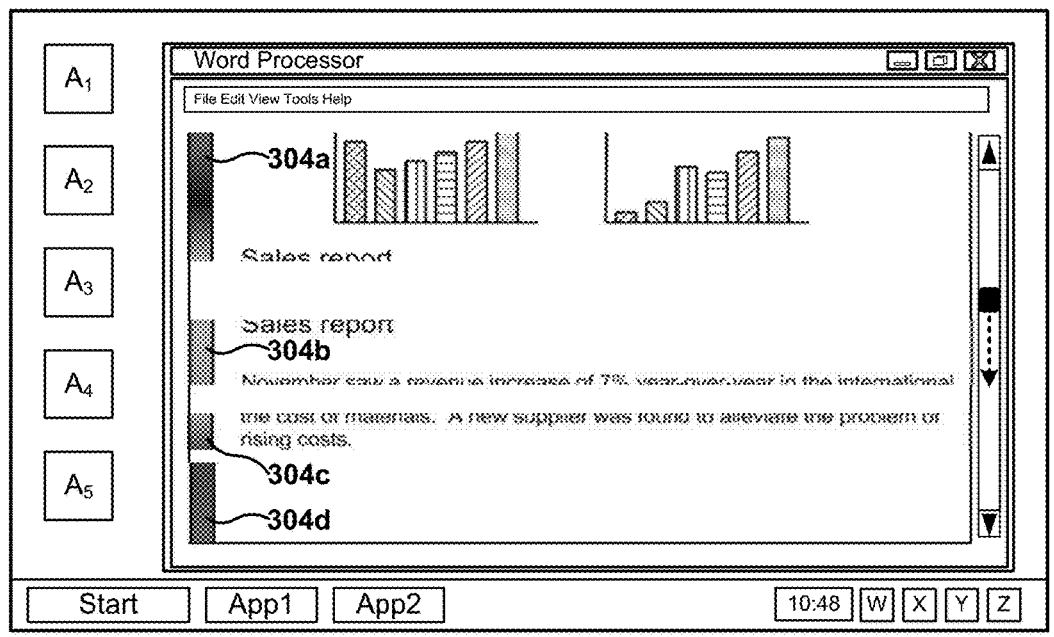

FIGS. 3A-3B illustrate the use of a color marker embedded inside a window display for measuring remote display quality, according to one embodiment. Embodiments presented herein insert a color marker in the window display of an application. The color marker is analyzed, as received in the remote client, to determine how window-altering operations change the color marker.

In various embodiments, described herein, the color marker is also referred to as a color strip, color map, or pixel strip. In some embodiments, the pixel strip is rectangular. The width of the rectangle may vary from one pixel to 10, or 250, or any other value. In other embodiments, the pixel strip might have other shapes, such as lines, curves, circles or other oval patterns, blobs, or any other region of the display area.

In general, the color map occupies a small fraction of the display area in a window. For example, as shown in FIG. 3A, the color marker 302 is located on a left side of the display area used for presenting text and graphics. It is noted that the color marker 302 may be only visible in part within a window, and the actual color marker may be larger than what is shown on the display. For example, in one embodiment, the color marker occupies five pixels on the left side of a whole text document.

In one embodiment, the color marker includes a plurality of pixels that change color values according to the location of the pixel within the document. For example, the color marker may include a color gradient that varies along the whole length of the document.

In some embodiments, the color marker is inserted in an application document using data that is native to the application document. As a result, the application document with the color marker may be opened by the application as any other application document. In the embodiment of FIG. 3A, the color marker 302 is inserted as a background image in a multimedia document. When the word processor opens the preprocessed document, the color marker 302 is displayed on the word processor window.

Examples of common applications where the color marker may be inserted as data native to the application include word processors that can handle graphics (e.g., Microsoft Word™, Microsoft PowerPoint™, Adobe Acrobat™, OpenOffice™, etc.), spreadsheets (e.g., Microsoft Excel), drawing applications (e.g., Microsoft Visio™, Corel™), Computer Aided Design (CAD) tools, etc.

By inserting the color marker in a fraction of the display window, the VDI system is not significantly perturbed by the test to measure window operations performance.

FIG. 3B illustrates an example of a scroll operation and the changes in the displayed color marker 302. When the display area is broken into different segments (possibly due to different display updates), the color marker is also broken into a plurality of segments 304a, 304b, 304c, and 304d. By analyzing how the segments of the color marker are displayed during the scroll operation, it is possible to calculate a performance metric for the display based on the evolution of the color marker during a plurality of display updates or a plurality of video frames.

In one embodiment, the color gradient of the color strip inserted into the application document is dependent on two parameters: page number and page offset within the page. The page offset depends upon how the page is divided. For example, the page could be divided into 80 sections reflecting the number of lines in a Word document or the number of lines in a PDF document. In some embodiments, this is a configurable parameter and can be changed based on the length of the document. This dependency may be expressed with the following formula:

$$\text{color}(p_i) = \text{color\_fx}(pn, po) \quad (1)$$

Where $p_i$ is a pixel, color_fx is a function, pn is the page number, and po is the page offset within page pn. In one embodiment, this function color_fx( ) is a linear function with a one-to-one mapping between the color and pn and po. The one-to-one mapping is utilized by the performance agent at the client to identify the location within a document of the pixels found on the display. In other words, given a pixel value, the performance agent is able to apply the inverse of the function color_fx( ) to identify the location in the document given by the page number and the offset within the page.

In one embodiment, when a scroll operation is initiated from the client side, the performance agent examines the frame-buffer at pre-defined locations, extracts the pixel color information and leverages the inverse color_fx function to determine the page number and page offset that corresponds to these points. This information, along with the timing of the window changes, allows the performance agent to accurately determine the smoothness of the scroll operation.

Accordingly, the smoothness of the scroll operation may be measured by the performance agent. Different tests may be performed, such as a scrolling one line, scrolling a few lines, scrolling a whole page, scrolling a page and a half, scrolling multiple pages, etc. For example, one test (predefined and captured within a test script) includes scrolling 100 lines in 500 ms. Then, the actual amount of time and quality of the scroll in the remote display is measured and compared to the expected values. This way, a performance metric for the scroll operation is calculated based on the comparison.

Figure 4A:
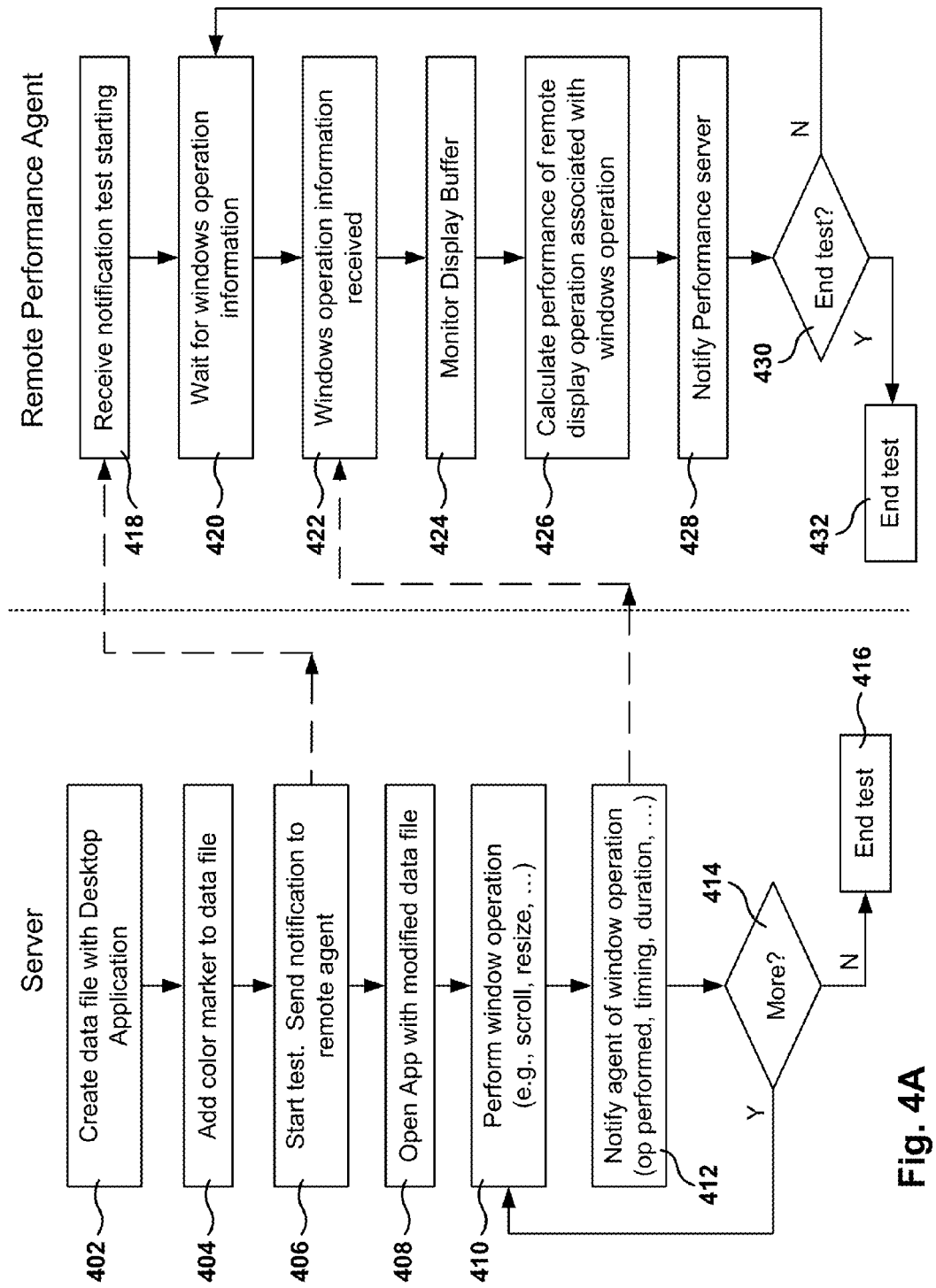
FIG. 4A is a flowchart of a method for measuring remote display quality when performing window-altering operations, according to one embodiment.

FIG. 4A is a flowchart of a method for measuring remote display quality when performing window-altering operations, according to one embodiment. While the various operations in this flowchart are presented and described sequentially, one of ordinary skill will appreciate that some or all of the operations may be executed in a different order, be combined or omitted, or be executed in parallel.

On the server side, in operation 402 a data file is created for a desktop application (e.g., a Word document for Microsoft Word, or a PDF document for Adobe reader, etc.). From operation 402, the method flows to operation 404 where the color marker is added to the data file created in operation 402. In one embodiment, the color marker is added using features available in the corresponding application, that is, the color marker is embedded as an object recognized by the application. This way, the data file may be opened by the application, and the color marker will be displayed based on the information included in the data file.

From operation 404, the method flows to operation 406 where the window-modification test is started. In one embodiment, a notification that the test has started is sent to the remote performance agent. In another embodiment, the notification is not sent and the remote agent will scan the remote display buffer to detect the beginning of window-altering operations.

From operation 406, the method flows to operation 408 where the application is opened with the modified data file that includes the color marker. The application is opened as a result of a request to open the document on the desktop, and the desktop view is updated at the server. The changes in the desktop view cause one or more display updates to be sent to the client. The opened window on the desktop view includes the color marker, or at least a section of the color marker.

From operation 408, the method flows to operation 410 where a window-altering operation is performed (e.g., resizing, moving, scrolling, zooming in, etc.). In one embodiment, a testing script is executed on the server that performs the required windows operations. In this case, the window operations have predefined changes as well as timing information, which is shared with the remote agent. Based on the changes of the window and the timing information, the remote agent is able to calculate the performance metric according to the changes shown on the remote display.

In another embodiment, testing is performed on actual window operations that may be performed by an operator. In this case, a server application captures the changes to the window as well as timing information, and the server application sends this information to the remote agent for calculating the quality of the display updates.

From operation 410, the method flows to operation 412 where the agent is notified of the window operation performed, which includes changes to the window operation, duration of the changes, timing, etc. In one embodiment, operation 412 is optional if the testing is performed with a script and the remote agent is able to obtain the timing information in some other way.

From operation 412, the method flows to operation 414 where a check is made to determine if there are more window operations to be performed. If there are more window operations to be tested, the method flows back to operation 410, and if there are no more window operations for testing, the method flows to operation 416 where the test is ended.

On the client-side, a remote performance agent is executed for calculating the performance metrics. In operation 418, the remote performance agent receives a notification (sent from the server in operation 406) that a test has been started.

From operation 418, the method flows to operation 420 where the remote agent waits for information regarding the start of a windows-altering operation. In one embodiment, this operation is optional and the method flows directly to operation 424 to start monitoring the display buffer for changes to the graphical user interface containing the windows.

From operation 420, the method flows to operation 422 where information about the windows operation performed is received (information that was sent from the server in operation 412). From operation 422, the method flows to operation 424 for the remote agent monitors the display buffer by searching for the color marker and the detecting that a windows-altering operation has taken place.

The frequency at which the frame buffer is examined can be a pre-set frequency, or the performance agent checks the display buffer every time the performance agent is informed of a frame buffer update. In one embodiment, to reduce the computational overhead of the tests on the client, the frame-buffer is not exhaustively searched. Rather, the frame-buffer is queried at a plurality of locations. These locations are determined based on the nature of the test being undertaken. For example, if a scroll operation is taking place, the performance agent has knowledge of the application window location on the desktop and can determine the search location appropriately. These locations may be static for the duration of the test (e.g. scroll) or may move across the desktop (e.g. drag) depending on the exact parameters of the test.

When sampling is used to identify the remote display quality, the whole color strip is not checked and instead a plurality of pixels within the color marker are measured and compared to expected values in order to determine quality. In one embodiment, a 3% of pixels are examined but other values are also possible, such as 0.1% to 50%, or any other value up to 99%.

From operation 424, the method flows to operation 426 where the quality performance metric is calculated for the remote display operation based on the pixel data identified in the display buffer and the associated timing information and expected values. For example, in a scroll operation the color changes in the color marker identify how far along the document the scroll has progressed, and how long the scroll has taken. This information is compare to the expected value of the scroll operation based on the timing information of the scroll operation. For example, the remote agent may identify that a scroll operation started 300 ms earlier, but the color pixel values in the color marker show that the scroll operation has only progressed a value associated with 200 ms. Therefore, at this point in time the scroll operation in the remote display is lagging by 100 ms.

Besides delay, other values regarding quality may also be calculated, such as smoothness of the scroll operation (or any other motion operation), number of pixels updated, etc. More details regarding quality metrics are provided below with reference to FIG. 4B.

From operation 426, the method flows to operation 428 where a performance server is notified of the identified performance related data obtained. In one embodiment, the calculations identified herein for obtaining performance metrics are performed at a server instead of at the remote performance agent. This means that, in one embodiment, the performance agent sends the data obtained to the server for further processing.

From operation 428, the method flows to operation 430 where a check is made to determine if the test has ended. If the test has ended, the method flows to operation 432 to end the test, otherwise the method flows back to operation 420.

It is noted that the embodiments illustrated in FIG. 4A are exemplary. Other embodiments may utilize different coordination events, perform different quality metrics, have the performance agent send data back to the server, etc. The embodiments illustrated in FIG. 4A should therefore not be interpreted to be exclusive or limiting, but rather exemplary or illustrative.

Figure 4B:
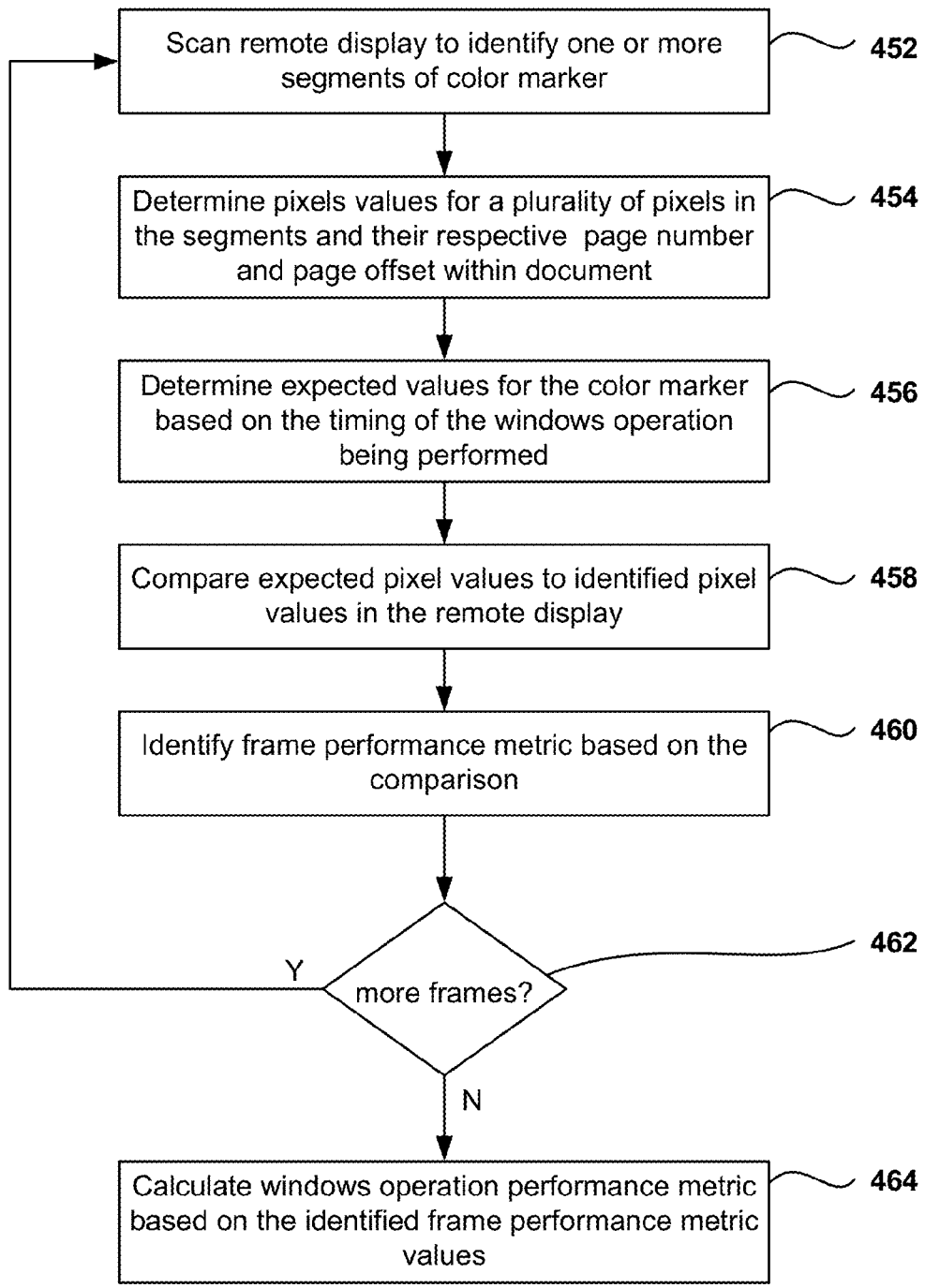
FIG. 4B is a flowchart of a method for measuring remote display performance by scanning the pixels of the color marker in the remote display, according to one embodiment.

FIG. 4B is a flowchart of a method for measuring remote display performance by scanning the pixels of the color marker in the remote display, according to one embodiment. While the various operations in this flowchart are presented and described sequentially, one of ordinary skill will appreciate that some or all of the operations may be executed in a different order, be combined or omitted, or be executed in parallel.

In operation 452, the remote display buffer is scanned to identify one or more segments of the color marker. In one embodiment, the performance monitoring system can perform a sequence of input events and the client device receives updates to the GUI from the virtual desktop server.

In some embodiments, the performance-monitoring system can perform a workload by executing a script to compute a display performance metric for a virtual desktop server. The workload script can include instructions to generate input events for the GUI, such as a mouse event (e.g., click, scroll, etc.), a key-input event (e.g., from a keyboard), or a touch screen event (e.g., a screen coordinate, a finger gesture, etc.). Further, the system can characterize a feature of the GUI at a regular sampling rate to determine a sequence of frames that include updates to the GUI, and match these frames to their corresponding input events. The system uses timestamp information for the input events and their corresponding frames to determine the display performance of the remote desktop.

During transmission, the color marker may be displayed on the remote desktop as one segment, or may be broken into different segments, depending on how the windows-altering operation and the transmission affects the color marker.

From operation 452, the method flows to operation 454 to determine the pixel values for a plurality of pixels in the segments identified in operation 452. In addition, the respective page number and page offset are identified for the plurality of pixels, based on the color value of the pixels (e.g., using equation (1)).

In one embodiment, when the system initiates an input event (e.g., to move the mouse pointer to a different position), the system communicates this input event to the virtual desktop server over the network. In one embodiment, the system models each input event using a tuple $e(t_e, n)$, where the $i^{th}$ input event $e_i$ has a sequence number n and a timestamp $t_{ei}$. When the system performs an input event, the system creates one or more corresponding tuples that model the input event and stores the one or more corresponding tuples in a log file.

In another embodiment, the system detects a sequence of frames displayed at the client, as a result of polling a frame buffer to measure a feature of the GUI in the frame. As a result, the system can sample a fixed number of points that are distributed evenly throughout a portion of the GUI to detect a window movement or an image position based on the location of the color marker or the location of other window features (e.g., a window border pattern). The presence of the color marker may indicate whether the window has been updated in any way (e.g., due to moving, resizing, scrolling, or any other transformation). The system can calculate a motion vector for each point, and uses a majority-voting algorithm to determine a final motion vector for the frame. The system models the motion vector for each frame using the tuple $u(v, t)$, where the $i^{th}$ frame $u_i$ has a motion vector $v_i$ and a timestamp $t_{ui}$. The system then stores the motion vector and the timestamp for the frame in the log file. It is noted that a motion vector is, in one embodiment, a two-dimensional vector that indicates the movement of a pixel or pattern.

From operation 454, the method flows to operation 456 where the expected values for the color marker are determined based on the timing of the windows operation being performed. In other words, the remote agent calculates the expected values of the color marker-based on the windows-altering operation.

From operation 456, the method flows to operation 458 where the expected pixel values are compared to the pixel values found in the remote display. This creates a comparison of what is expected versus what is actually happening in the current frame. The bigger the difference between the expected values and the received values, the worse the quality of the remote display.

From operation 458, the method flows to operation 460 where the frame performance metric is calculated based on the comparison of the expected values with the actual values, as calculated in operation 458. Further, from operation 460, the method flows to operation 462 to perform a check to determine if more frames are expected for the quality test. If more frames are expected, the method flows to operation 452, and if no more frames are expected the method flows to operation 464.

In operation 464, the method calculates a windows operation performance metric based on the identified frame performance metric values for all the frames associated with the quality test. The system computes a display performance metric for the virtual desktop server based on timestamps for the detected sequence of frames and the input events. In some embodiments, the system can process the log file in a post-processing operation.

Further, the system can compute at least one or more several display performance metrics, such as "Total run time," "Smoothness," "Responsiveness," and "Frame yield." If the system detects a total of n motion vectors, the system calculates the total runtime T of a workload test using the following equation:

$$T = t_{un} - t_{e1} \qquad (2)$$

In one embodiment, the system starts a timer when the first event in a sequence is communicated to the virtual desktop server, and uses this timer to generate timestamps for each input event and for each motion vector. Equation (2) computes the total runtime T as the difference between the timestamps for the last detected motion vector $t_{un}$ and the first input event $t_{e1}$.

The smoothness metric is the mean delay between GUI-updating frames (X) and the standard deviation to the mean ($\sigma_x$):

$$X = \frac{\sum (t_{ui} - t_{u(i-1)})}{n} \qquad (3)$$

$$\sigma_x = \sqrt{\frac{\sum t_{ui} - X}{n}} \qquad (4)$$

Equation (3) computes the mean delay between GUI-updating frames, X, as the difference between the timestamps of two consecutive motion vectors. Further, equation (4) computes the standard deviation to the frame timestamps.

Responsiveness is the mean roundtrip delay between each input event and the corresponding frame, and in one embodiment is calculated with the following formula:

$$R = \frac{\sum (t_{ui} - t_{ei})}{n} \qquad (5)$$

In equation (5), ($t_{ui} - t_{ei}$) indicates the round-trip delay between an input event and a corresponding frame. Further, n is the total number of motion vectors in the log file (e.g., the number of GUI-updating frames that were detected), and i is an iterator to the motion vectors stored in the log file.

The system can compute the number of frames that were detected by counting the number of motion vectors in the log file |u|. The system can also compute the number of frames that were dropped by the virtual desktop server or during transmission with the following equation:

$$D = |e| - |u| \qquad (6)$$

Where |e| indicates the number of input events in the log file. Further, the system can compute the frame yield using the following equation:

$$Y = \frac{|u|}{|e|} \qquad (7)$$

In equation (7), the frame yield Y indicates the fraction of input events for which the system detects a motion vector.

In some embodiments, the system runs each workload script locally to collect local performance data and uses the local performance data to determine a baseline display performance score. Then, the system executes each workload script at the remote virtual desktop server to collect the remote performance data, and uses the local performance data to determine the raw display performance score for the virtual desktop server. The baseline display performance score provides a reference corresponding to the native display performance as if the user was accessing the application locally. The system can then calculate a user experience index by comparing the baseline display performance score with the raw display performance score. In addition, the user experience index metric may be normalized to generate this index based on how many frames were observed at the local client device and the total runtime when performing a heavy workload script.

Figure 5A:
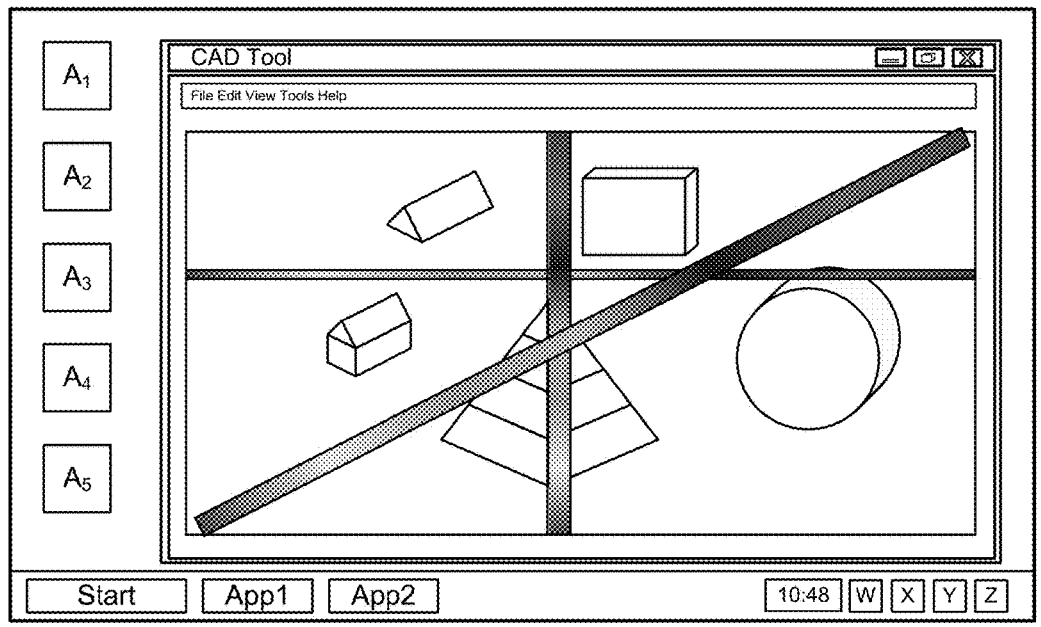
FIGS. 5A-5B illustrate the use of different color markers for different applications, according to several embodiments.
Figure 5B:
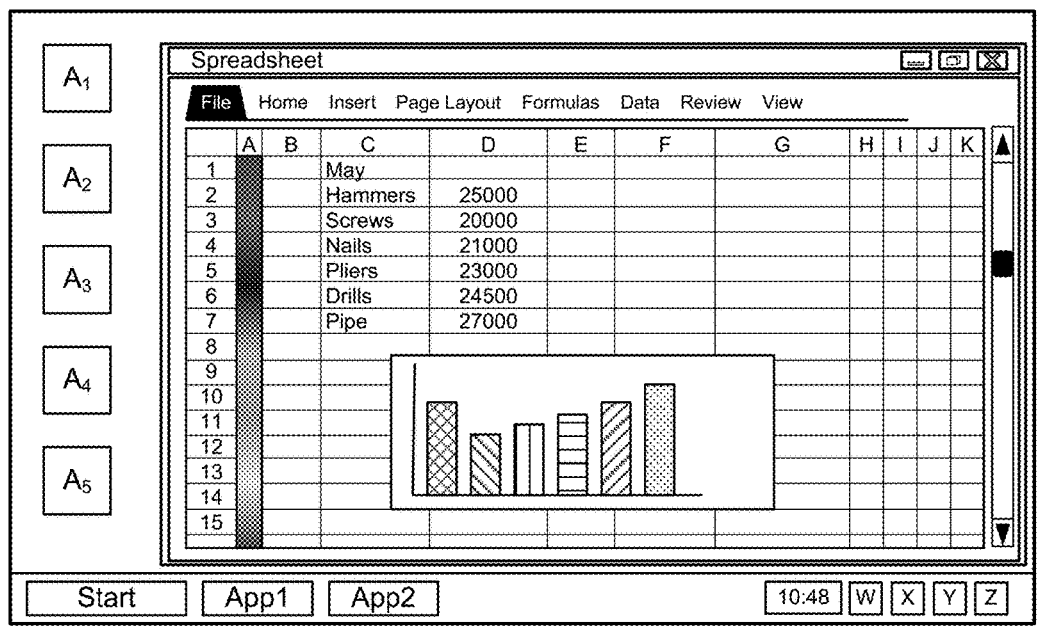

FIGS. 5A-5B illustrate the use of different color markers for different applications, according to several embodiments. FIG. 5A illustrates a window for a Computer Aided Design (CAD) application. The color marker is embedded as an object native to the CAD application.

In general, the color marker may be located in any part of the window, and generally takes a small amount of the display area for the window application. The color marker may be a rectangle in a horizontal position, vertical position, diagonal position, etc. FIG. 5A shows three different color markers: a horizontal color marker, a vertical color marker, and a diagonal color marker. Further, the color markers may vary the dimension of the width, as measured in pixels, from one pixel to 100 pixels, or more. FIG. 5A shows color markers with different widths.

Additionally, the color markers may have other shapes (not shown), such as a circle, an arc of a circle, a triangle, a curved line (e.g., like a snake shape), a T shape, other geometric figure, etc.

FIG. 5B illustrates an interface for a spreadsheet application (e.g., Microsoft Excel™), according to one embodiment. In one embodiment, the color marker is introduced as a gradient in a column of the spreadsheet. For example, the color marker may be included in the first column, but the color marker could also be embedded in other columns. Of course, the color marker may also be included in a plurality of columns, but the same can be achieved by changing the width of one column to match the desired width of the color marker.

This way, the spreadsheet may have regular user data plus the embedded marker in one column. In another embodiment, the color marker may also be embedded in one or more rows of the spreadsheet.

In one embodiment, the pixel values in the color marker are a function of the row number where the pixel is located. In another embodiment, the pixel value in the color marker is a function of the distance from the pixel to the top of the spreadsheet. This way, if rows in the spreadsheet have different heights, the pixel values are still linear with reference to the display of the spreadsheet application.

In order to perform a remote display quality test, the color strip is inserted in a regular spreadsheet document, by inserting a column with the color strip. As the spreadsheet is scrolled, or resized, the position or uncovered portion of the custom strip will change in response. This change can be detected on the client by examining the client's frame buffer for the custom color strip, and by examining the movement of the application as seen by the remote client.

Figure 6:
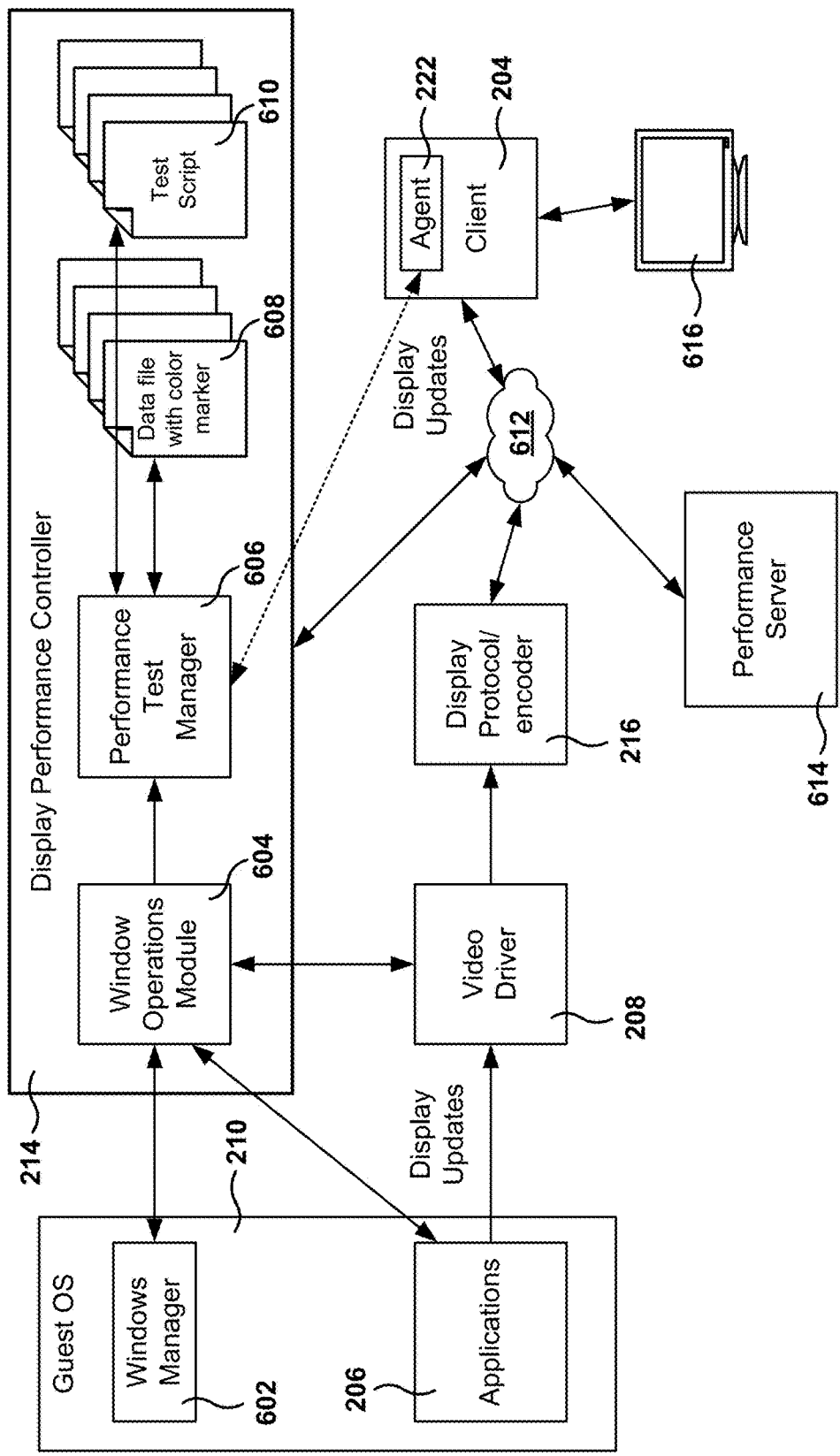
FIG. 6 illustrates a sample architecture for the measurement of video quality displayed on a remote client, according to one embodiment.

FIG. 6 illustrates a sample architecture for the measurement of video quality displayed on a remote client, according to one embodiment. The guest OS 210 includes a windows manager 602 and applications 206 executing in the remote client. The guest OS is associated with video driver 208, which may be also part of the guest OS, and when applications need to make changes to the desktop, the applications send requests to video driver 208. In one embodiment, an API is provided to access video driver 208.

The video driver exchanges data with the display protocol/encoder 216, which transmits the required display updates to remote client 204 over network 612. The remote desktop is displayed on display 616, which may be integrated within client 204 or connected to client 204.

In one embodiment, the display performance controller 214 includes a window operations module 604, a performance test manager 606, and data files. The data files include data files 608 native to windows applications and embedded color markers, and test scripts 610 for performing remote display test operations.

The windows operations module 604 monitors windows-altering operations on the desktop by interfacing with one or more of the windows manager 602, applications 206, video driver 208, and display protocol encoder 216. In one embodiment, the window operations module executes one test script 610 that defines how a window is modified in order to perform a test.

The performance test manager 606 coordinates the remote display quality tests. In one embodiment, the performance test manager 606 manages the data files with embedded color markers 608, and keeps a database of the data files. In addition, the performance test manager 606 communicates with the guest OS 210 and with the remote agent 222 in the client 204. In one embodiment, the performance test manager 606 further communicates with performance server 614 to exchange performance testing data or results.

In one embodiment, performance test manager 606 exchanges timing information with agent 222 regarding window operations performed on the server. For example, the performance test manager 606 may inform agent 222 of a test script being started, a window operation taking place, the duration of a window-altering operation, etc. In one embodiment, agent 222 sends performance data back to performance test manager 606 or to performance server 614.

It is noted that the embodiments illustrated in FIG. 6 are exemplary. Other embodiments may utilize different modules, combine the functionality of several modules into one, spread out the functionality of one or more modules over a plurality of servers, etc. The embodiments illustrated in FIG. 6 should therefore not be interpreted to be exclusive or limiting, but rather exemplary or illustrative.

Figure 7:
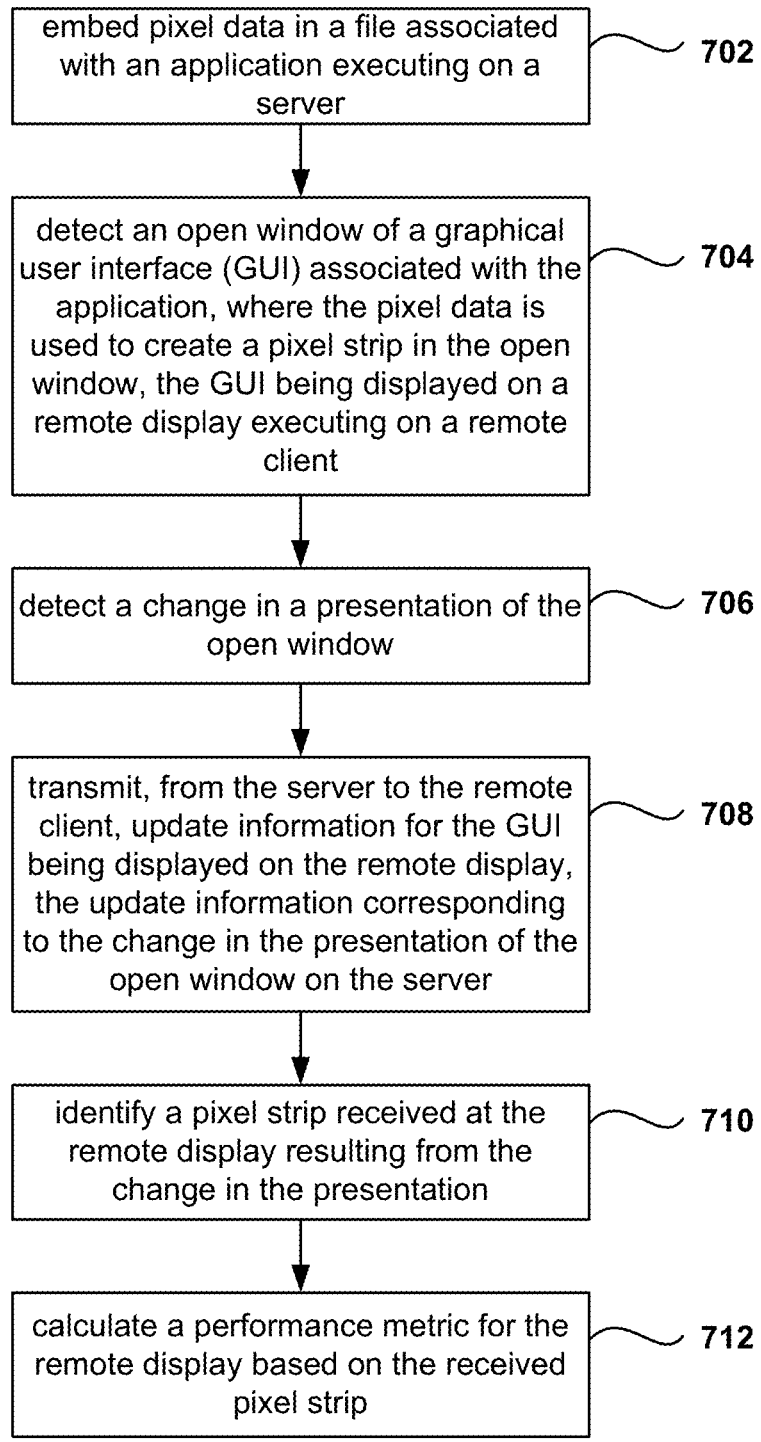
FIG. 7 is a flowchart of a method for measuring remote display performance, according to one embodiment.

FIG. 7 is a flowchart of a method for measuring remote display performance, according to one embodiment. While the various operations in this flowchart are presented and described sequentially, one of ordinary skill will appreciate that some or all of the operations may be executed in a different order, be combined or omitted, or be executed in parallel.

In operation 702, pixel data is embedded in a file associated with an application executing on a server. The pixel data may be embedded before a test, or a library of test data files may be created in advance for later use when a performance test is desired.

From operation 702, the method flows to operation 704 for detecting an open window in a graphical user interface (GUI) associated with the application. The pixel data is used to create a pixel strip in the open window, and the GUI is displayed on a remote display of a remote client.

From operation 704, the method flows to operation 706 for detecting a change in the display presentation of the open window. For example, the window may be maximized, minimized, resized, moved, or the contents of the window may be changed, such as by scrolling up or down, zooming in or out, paging up or down, executing a command to go the beginning, the end, or a specific place in the document, going up or down a line of a document, etc.

From operation 706, the method flows to operation 708 to transmit, from the server to the remote client, update information for the GUI being displayed on the remote display. The update information corresponds to the change in the presentation of the open window on the server. Further, from operation 708 the method flows to operation 710 to identify a pixel strip received at the remote display. This received pixel strip is the result of the detected change in the presentation of the window as performed in operation 706.

From operation 710, the method flows to operation 712 to calculate a performance metric for the remote display based on the received pixel strip. In one embodiment, the performance metric is calculated by analyzing a plurality of frame quality metric values for a plurality of display frames involved in the test of the window-altering operation.

Figure 8:
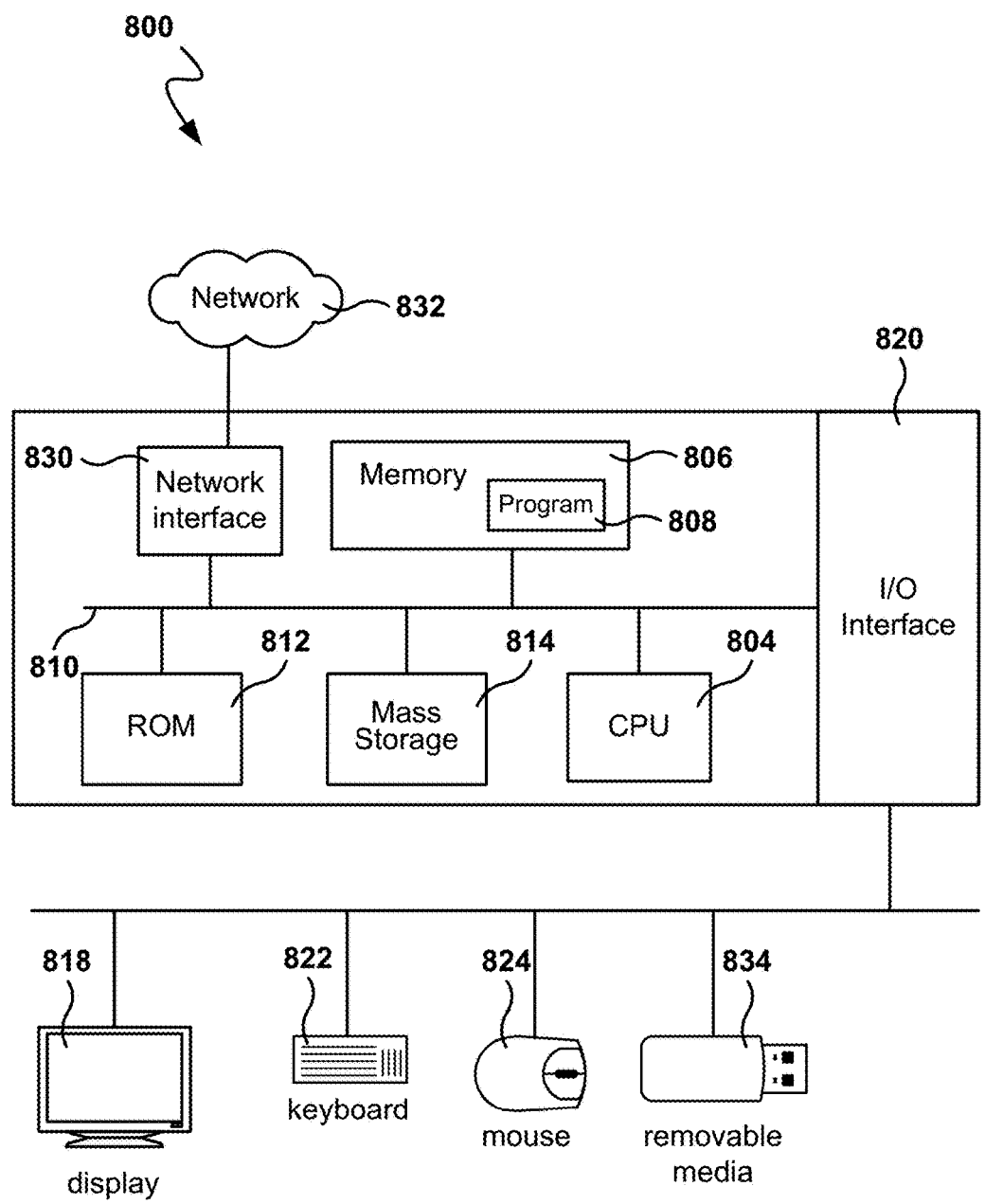
FIG. 8 is a simplified schematic diagram of a computer system for implementing embodiments presented herein.

FIG. 8 is a simplified schematic diagram of a computer system for implementing embodiments presented herein. It should be appreciated that the methods described herein may be performed with a digital processing system, such as a conventional, general-purpose computer system. Special purpose computers, which are designed or programmed to perform only one function may be used in the alternative. The computer system includes a Central Processing Unit (CPU) 804, which is coupled through bus 810 to random access memory (RAM) 806, read-only memory (ROM) 812, and mass storage device 814. Program 808 resides in random access memory (RAM) 806, but can also reside in mass storage 814. Program 808 may include a display performance controller program, such as the one in FIG. 2.

Mass storage device 814 represents a persistent data storage device such as a floppy disc drive or a fixed disc drive, which may be local or remote. Network interface 830 provides connections via network 832, allowing communications with other devices. It should be appreciated that CPU 804 may be embodied in a general-purpose processor, a special purpose processor, or a specially programmed logic device. Input/Output (I/O) interface provides communication with different peripherals and is connected with CPU 804, RAM 806, ROM 812, and mass storage device 814, through bus 810. Sample peripherals include display 818, keyboard 822, cursor control 824, removable media device 834, etc.

Display 818 is configured to display the user interfaces described herein. Keyboard 822, cursor control 824, removable media device 834, and other peripherals are coupled to I/O interface 820 in order to communicate information in command selections to CPU 804. It should be appreciated that data to and from external devices may be communicated through I/O interface 820.

Embodiments may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

The methods, systems and embodiments are not limited to any one brand of server or virtualization servers. In one embodiment, a hypervisor partitions physical servers to host multiple virtual machines. Each virtual machine may represent a complete system, with processors, memory, networking, storage and BIOS. The hypervisor enables multiple virtual machines to: (a) share physical resources, (b) run unmodified operating systems and applications, and (c) run the most resource-intensive applications side by side on the same server. Other hypervisors may have similar functionality or more or less functionality. Accordingly, the systems, methods and computer readable media can be practiced using any product, software, or hardware configuration.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method comprising:
  embedding pixel data in a file associated with an application executing on a server, wherein the pixel data is embedded in the file using data native to the application such that the file with the embedded pixel data can be opened by the application;
  detecting an open window of a graphical user interface (GUI) caused by the application opening the file, wherein the pixel data embedded in the file is used to create a pixel strip in a fraction of the open window, wherein a color of one or more pixels in the pixel strip is dependent on a page of the file and an offset within the page, the GUI being displayed on a remote display executing on a remote client;
  detecting a change in a presentation of the open window;
  transmitting, from the server to the remote client, update information for the GUI being displayed on the remote display, the update information corresponding to the change in the presentation of the open window on the server;

identifying the pixel strip received at the remote display resulting from the change in the presentation; and calculating a performance metric of the remote display based on the received pixel strip, wherein operations of the method are executed by a processor, wherein calculating the performance metric further includes:

identifying an expected value of one or more pixels associated with the received pixel strip; and comparing a received value of the one or more pixels in the received pixel strip to the expected value.

2. The method as recited in claim 1, wherein the file is a spreadsheet, wherein the color gradient is based on a row within the spreadsheet.

3. The method as recited in claim 1, further including:
sending, from the server to the client, timing information about the change in the presentation of the open window.

4. The method as recited in claim 3, wherein calculating the performance metric further includes:
measuring response time to the change in the presentation on the remote display based on the timing information and the received pixel strip.

5. The method as recited in claim 1, wherein the remote display is one of a remote display for a virtual machine or a remote display being displayed on a frame of a local display coupled to a computing device.

6. The method as recited in claim 1, wherein the change in the presentation of the open window is caused by a scroll window operation or a resize window operation.

7. The method as recited in claim 1, wherein the color of the one or more pixels is computed based on the following formula:

$$color(p_i) = color\_fx(pn, po);$$

wherein $p_i$ is a pixel, color_fx is a function, pn is a page number, and po is the offset within page pn.

8. A method comprising:
displaying a remote display on a remote client, the remote display including representation of a graphical user interface (GUI) executing on a server, the GUI being operable to display an open window for an application executing on the server;

receiving data regarding a change in a presentation of the open window caused by the application opening a file, wherein pixel data is embedded in the file associated with the application using data native to the application, wherein the pixel data embedded in the file is used to create a pixel strip in a fraction of the open window, wherein a color of one or more pixels in the pixel strip is dependent on a page of the file and an offset within the page;

identifying the pixel strip received at the remote display resulting from the change in the presentation; and calculating a performance metric for the remote display based on the received pixel strip, wherein operations of the method are executed by a processor, wherein calculating the performance metric further includes:

identifying an expected value of one or more pixels associated with the received pixel strip; and comparing a received value of the one or more pixels in the received pixel strip to the expected value.

9. The method as recited in claim 8, wherein the pixel data is a background image within a document.

10. The method as recited in claim 8, wherein the pixel data is one or more images inserted in one or more cells of a spreadsheet.

11. The method as recited in claim 8, wherein the pixel strip is one or more of a horizontal band or a vertical band.

12. The method as recited in claim 8, wherein operations of the method are performed by a computer program when executed by one or more processors, the computer program being embedded in a non-transitory computer-readable storage medium.

13. The method as recited in claim 8, wherein the color of the one or more pixels is computed based on the following formula:

$$color(p_i) = color\_fx(pn, po);$$

wherein $p_i$ is a pixel, color_fx is a function, pn is a page number, and po is the offset within page pn.

14. A non-transitory computer-readable storage medium storing a computer program, the computer-readable storage medium comprising:

program instructions for embedding pixel data in a file associated with an application executing on a server, wherein the pixel data is embedded in the file using data native to the application such that the file with the embedded pixel data can be opened by the application;

program instructions for detecting an open window of a graphical user interface (GUI) caused by the application opening the file, wherein the pixel data embedded in the file is used to create a pixel strip in a fraction of the open window, wherein a color of one or more pixels in the pixel strip is dependent on a page of the file and an offset within the page, the GUI being displayed on a remote display executing on a remote client;

program instructions for detecting a change in a presentation of the open window;

program instructions for transmitting, from the server to the client, update information corresponding to the change in the presentation of the open window, the update information including at least a portion of the pixel strip;

wherein, in response to receiving the update information, the client is configured to:

identify the pixel strip received at the remote display resulting from the change in the presentation; and calculate a performance metric for the remote display based on the received pixel strip, wherein calculating the performance metric further includes:

identifying an expected value of one or more pixels associated with the received pixel strip; and comparing a received value of the one or more pixels in the received pixel strip to the expected value.

15. The computer-readable storage medium as recited in claim 14, wherein the file is a spreadsheet, wherein the color gradient is based on a row within the spreadsheet.

16. The computer-readable storage medium as recited in claim 14, further including:
program instructions for sending timing information about the change in the presentation of the open window.

17. The non-transitory computer-readable storage medium as recited in claim 14, wherein the color of the one or more pixels is computed based on the following formula:

$$color(p_i) = color\_fx(pn, po);$$

wherein $p_i$ is a pixel, color_fx is a function, pn is a page number, and po is the offset within page pn.

* * * * *